(12) United States Patent
Aaltonen et al.

(10) Patent No.: US 7,505,731 B2
(45) Date of Patent: Mar. 17, 2009

(54) SYSTEM AND METHOD FOR DELIVERY OF CONTENT BY A NETWORK BASED UPON A PREDEFINED CONDITION

(75) Inventors: Janne Aaltonen, Turku (FI); Juha Salo, Littoinen (FI)

(73) Assignee: Nokia Corporation, Espoo (FI)

(*) Notice: Subject to any disclaimer, the term of this patent is extended or adjusted under 35 U.S.C. 154(b) by 1131 days.

(21) Appl. No.: 09/991,754

(22) Filed: Nov. 26, 2001

(65) Prior Publication Data
US 2002/0069406 A1 Jun. 6, 2002

(30) Foreign Application Priority Data
Nov. 24, 2000 (GB) .................. 0028732.6

(51) Int. Cl.
*H04H 1/00* (2006.01)
*H04B 7/00* (2006.01)
*H04K 11/00* (2006.01)

(52) U.S. Cl. .............. 455/3.01; 455/344; 455/66.1

(58) Field of Classification Search ............ 455/3.01, 455/3.02, 3.03, 3.04, 3.06, 66.1, 344, 552.1, 455/553.1
See application file for complete search history.

(56) References Cited

U.S. PATENT DOCUMENTS

| | | | |
|---|---|---|---|
| 5,241,685 A * | 8/1993 | Bodin et al. ................ 455/453 |
| 5,721,733 A * | 2/1998 | Wang et al. ................. 370/332 |
| 6,535,854 B2 * | 3/2003 | Buchner et al. ............. 704/275 |
| 6,600,918 B1 * | 7/2003 | Youngs et al. ........... 455/414.3 |
| 6,618,585 B1 * | 9/2003 | Robinson .................. 455/3.02 |
| 6,681,115 B1 * | 1/2004 | McKenna et al. ........... 455/517 |
| 6,704,576 B1 * | 3/2004 | Brachman et al. ........... 455/503 |
| 6,714,797 B1 * | 3/2004 | Rautila .................... 455/552.1 |
| 6,728,531 B1 * | 4/2004 | Lee et al. .................... 455/419 |
| 6,904,264 B1 * | 6/2005 | Frantz ....................... 455/3.04 |
| 6,947,703 B2 * | 9/2005 | Ceresoli et al. ............ 455/3.02 |

FOREIGN PATENT DOCUMENTS

| | | |
|---|---|---|
| EP | 1028597 A3 | 11/2001 |
| GB | 2 313 981 | 12/1997 |
| GB | 2 355 896 | 5/2001 |
| WO | 99/18684 | 4/1999 |
| WO | 99/33076 | 7/1999 |
| WO | 00/08884 A1 | 2/2000 |

OTHER PUBLICATIONS

PCT European Search Report; EP01309884, pp. 1-3.
European Telecommunication Standard, "Digital Video Broadcasting (DVB); Interaction channel through the Global System for Mobile communications (GSM)," jointly produced by Joint Technical Committee (JTC) Broadcast of the European Broadcasting Union (EBU), Comite Europeen de Normalisation ELECtrotechnique (CENELEC) and the European Telecommunications Standards Institute (ETSI), published Feb. 1999.

(Continued)

*Primary Examiner*—Tilahun Gesesse
(74) *Attorney, Agent, or Firm*—Banner & Witcoff, Ltd.

(57) ABSTRACT

A content delivery service is described for delivering content over a broadband digital broadcast network (7). A controller (27) allows the delivery of content to be made in accordance with activity in a public land mobile network 1. The delivery of content may therefore be effectively scheduled and n appropriate revenue level.

26 Claims, 2 Drawing Sheets

OTHER PUBLICATIONS

European Telecommunication Standard, "Digital Video Broadcasting (DVB); Network-independent protocols for DVB interactive services," jointly produced by Joint Technical Committee (JTC) Broadcast of the European Broadcasting Union (EBU), Comite Europeen de Normalisation ELECtrotechnique (CENELEC) and the European Telecommunications Standards Institute (ETSI), first edition: Nov. 1997.

"Digital Video Broadcasting (DVB); Guidelines for implementation and usage of the specification of network independent protocols for DVB interactive services," Technical Report, jointly produced by Joint Technical Committee (JTC) Broadcast of the European Broadcasting Union (EBU), Comite Europeen de Normalisation ELECtrotechnique (CENELEC) and the European Telecommunications Standards Institute (ETSI), copyrighted 1997.

European Telecommunication Standard, "Digital Video Broadcasting (DVB); Interaction channel through Public Switched Telecommunications Network (PSTN)/Integrated Services Digital Networks (ISDN)," jointly produced by Joint Technical Committee (JTC) Broadcast of the European Broadcasting Union (EBU), Comite Europeen de Normalisation ELECtrotechnique (CENELEC) and the European Telecommunications Standards Institute (ETSI), first edition: Aug. 1997.

* cited by examiner

SYSTEM AND METHOD FOR DELIVERY OF CONTENT BY A NETWORK BASED UPON A PREDEFINED CONDITION

BACKGROUND OF THE INVENTION

1. Field of the Invention

The present invention relates to delivery of content over a broadcast network and in particular to a broadband digital broadcast network.

2. Description of the Prior Art

As is well known, broadband digital broadcast (BDB) networks, such as the terrestrial Digital Video Broadcast (DVB-T) network, are intended to deliver content in the form of a television broadcast and can also deliver data in a multicast/unicast. The delivery of data and indeed any other service as a multicast or unicast requires the presence of some form of conditional access to ensure the content reaches the correct terminal. Furthermore, to provide interactivity, it is necessary to provide a return channel linking a terminal to the network. In this way, a request for content can be communicated to the network which may subsequently deliver the content to the terminal.

It has thus been the case that content has been delivered either at the request of the receiving terminal or at the instigation of the network. In the latter case, the network might receive a request from an external content provider to deliver content in the form of an advertisement or the like over the network. Such a request might lead to the content being broadcast, multicast, or even unicast. However, the decision for a content provider as to how and when to request the delivery of content is hampered by the unidirectional nature of the network.

SUMMARY OF THE INVENTION

Thus, according to one aspect of the invention, there is provided a controller connectable to first and second wireless networks, the controller including a processor operable to initiate delivery of content by the first network in response to a criterion being met by data derived from the second network.

The invention is particular applicable to content delivery by those networks which either do not have or only posses limited return channel capability. Such networks are not suited to the delivery of targeted content such as, for example, advertising. The invention provides the content provider with the advantage of being able to target the delivery of content much more effectively. Preferably, the second network will be selected to the extent that it can provide data advantageous for targeting delivery of content by the first network. Thus, for example, the second network may be a public land mobile network such as a GSM based network. In which case, data relating to the user activity in the network, such as might be stored in a GSM Home Location Register (HLR) may be provided to the first network, which could be a broadband digital broadcast network exemplified by a Digital Video Broadcast (DVB) network. Advantageously, the data derived from the second network will allow the content provider to tailor content to suit the desired audience. Thus an advertiser will be able to develop content to suit a particular market opportunities.

Preferably, the criterion is established as a function of at least one indicia representative of user activity in the second network. One criterion may be when the data derived from the second network exceeds a predetermined threshold value. Conveniently, more than one indicia may be utilized in generating a criterion for the delivery of content. Advantageously, the selection of an indicia allows a content provider to make an assessment of the intended audience of the content to be delivered. Thus, a geographical indicia might be appropriate where the content relates to a particular location such as the provision of services in an area for example hotel rooms. In which case a level of user activity could be monitored in that area which, when exceeded, would trigger the delivery of content. Another example of a geographical indica could be a concentration of user activity at a particular venue such as a conference center or sport stadium. The content provider could then arrange delivery of content appropriate to that venue once a certain threshold of user activity had been reached. An alternative indicia could be an identification of user activity amongst a certain population of users identified to the second network. Such an indicia might rely on profiling by the network, revealing data such as grouping users by the length of time they are active in making use of the network or those whose pattern of use takes them to well defined locations such as airports for example on a regular basis.

Further advantages of the invention stem from the fact that because delivery of content may be initiated or controlled to occur under certain specific conditions, it is possible for the network provider to levy corresponding charges for the delivery of content. This ability is reinforced by the fact that the network operator can clearly identify to a potential content provider the audience available or even more usefully identify a potential audience in advance to which content could be delivered.

The data derived from the second network may comprise a number of connected user terminals to the second network. The first wireless network may be a unidirectional digital broadband network, such as, a Digital Video Broadcast (DVB) network, and the second wireless network may be a bi-directional communications network.

According to a further aspect of the invention, there is provided a content delivery system comprising first and second wireless networks and a controller connected thereto, the controller including a processor operable to initiate delivery of content by the first network in response to a criterion being met by data derived from the second network.

Although the controller might be physically integrated with either the first or second networks, it could be provided as a separate entity in which case the connections to the other networks could be conventional in the sense of being dedicated to the purpose or the controller could be connected over a further network such as an intranet or the Internet. Such flexibility is advantageous in that it allows for the most effective integration of the controller with existing networks and in particular allows access to the controller to those responsible for establishing the content delivery criterion. Thus, the controller could be operated by a service provider or even a content provider.

According to a still further aspect of the invention, there is provided a content delivery method comprising monitoring user activity in a second network relative to a criterion and delivering content to a terminal of a first network when the criterion is met.

According to a still further aspect of the invention, there is provided a controller connectable to a wireless unidirectional digital broadband network and to a wireless bi-directional communications network, the controller including a processor operable to initiate delivery of content via the wireless unidirectional digital broadband network to a determined area in response to a number of user terminals in the determined area connected to the wireless bi-directional communications area exceeding a predetermined threshold value.

According to a still further aspect of the invention, there is provided a content delivery system comprising:

a wireless unidirectional digital broadband network;

a wireless bi-directional communications network; and a controller connected to both networks, the controller including a processor operable to initiate delivery of content via the wireless unidirectional digital broadband network to a determined area in response to a number of user terminals in the determined area connected to the wireless bi-directional communications area exceeding a predetermined threshold value.

According to a still further aspect of the invention, there is provided a content delivery system, comprising;

a wireless unidirectional digital broadband network;

a wireless bi-directional communications network; and a controller connected to both networks, the controller comprising:

a processor;

a storage device; and software operative on the processor for:

maintaining in the storage device a database including threshold values associated with content corresponding to user activity;

monitoring user activity in a wireless bi-directional communications network; and delivering the content to a terminal connected to a wireless unidirectional digital broadband network when the user activity exceeds the corresponding threshold value.

According to a still further aspect of the invention, there is provided content delivery method comprising monitoring user activity in a wireless bi-directional communications network within an area and delivering content to a user terminal of a wireless unidirectional digital broadband network when a number of connected user terminals to the wireless bi-directional communications network within the area exceeds a predetermined threshold value.

BRIEF DESCRIPTION OF THE DRAWINGS

In order to aid in understanding the present invention, a particular embodiment thereof will now be described by way of example and with reference to the accompanying drawings, in which.

DETAILED DESCRIPTION OF THE PREFERRED EMBODIMENTS OF THE INVENTION

Figure 1:
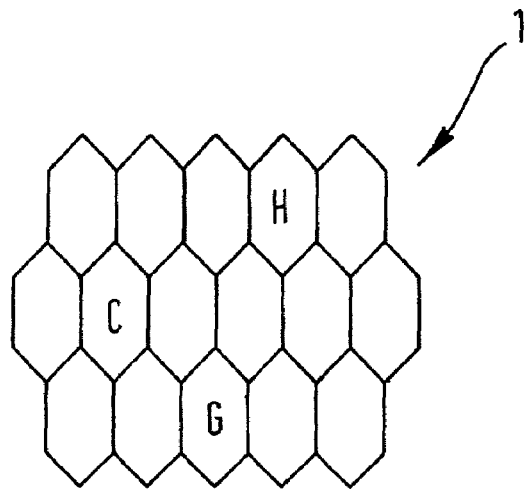
FIG. 1 is a diagrammatic view of a prior art Public Land Mobile Network (PLMN) topology.

Referring to FIG. 1, there is shown a typical cellular topology of a public land mobile network (PLMN) 1 covering a region. As is well known to those skilled in the art, the PLMN 1 remains informed of a cell in which a mobile station (MS) (not illustrated) is located. Typically, an MS periodically contacts the PLMN 1 and the PLMN 1 stores location information in a database known in the GSM case, at least, as a Home Location Register (HLR) (not illustrated). Depending on the particular PLMN 1, the location information stored in the HLR may indicate at best a particular cell in which a MS is located or alternatively, a group of cells. Again depending on the particular PLMN, the HLR will obtain periodic updates of the MS location. The information held in the HLR relating to a MS is, of course, required to enable connection of a call to a MS.

Within the region covered by the PLMN 1, there are a number of cells in which concentrations of MS may, from time to time occur. Thus in Cell C there is located a conference center, in Cell G an airport and in Cell H a motorway junction. Clearly, any increase in the number of MS in these or indeed any other cell in the PLMN 1 will be represented in the information stored in the HLR.

Figure 2:
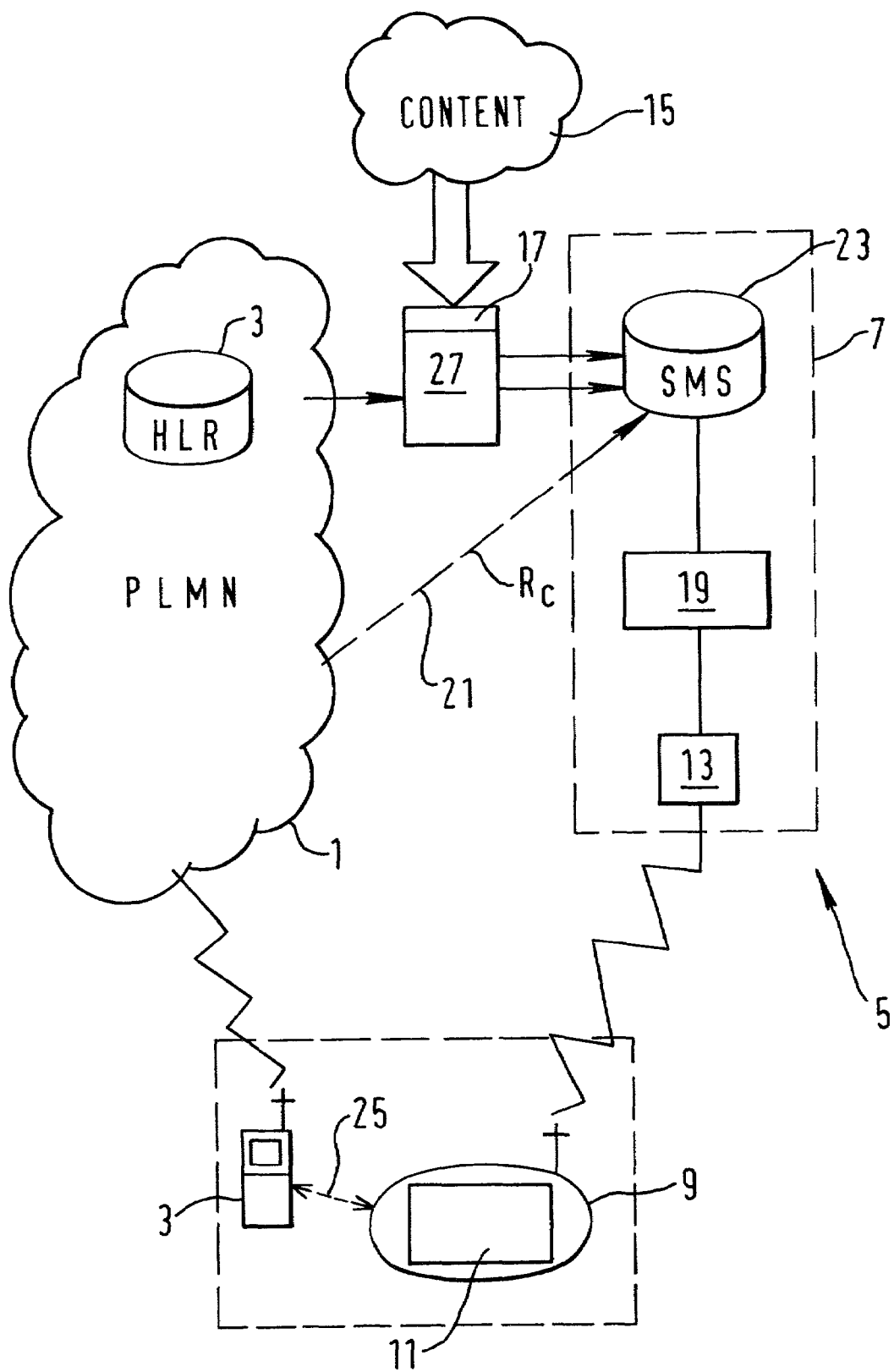
FIG. 2 is schematic view of a content delivery system according to one aspect of the present invention.

Turning now to FIG. 2, this illustrates a content delivery system 5 including a terrestrial broadband digital broadcast (BDB) network 7 namely a digital video broadcast (DVB-T) network. A user equipped with a suitable terminal 9 incorporating a receiver (not shown), display 11 and user interface (not shown) can receive data broadcast by the BDB network 7 from a transmitter 13. The data broadcast by the transmitter 13 is derived from a variety of sources 15 via a gateway 17 and may include IP and Television content.

Before transmission, the data received from each source is processed in head-end equipment 19. As is well known in the art, the head end equipment 19 places the data into MPEG-based data containers. To cater for the delivery of data to a particular terminal 9 or group of terminals, the containers may also hold address information which can be identified and read by a conditional access component in each terminal 9 to determine whether the data is intended for that terminal 9. The BDB network 7 also provides the facility for suitably equipped terminals 9 to interact with the BDB network 7. By suitably equipped terminal is meant a terminal 9 having a return channel Rc 21 for providing network interactivity as exemplified in the case of DVB by a number of specifications published by the Digital Video Broadcasting Office and also the European Telecommunications Standards Institute (ETSI) including the following: DVB-NIP Network Independent Protocols for DVB Interactive Services ETS 300 802 (V1: 11/97), Guidelines for the use of the Network Independent Protocols for DVB Interactive Services TR 101 194 (V1.1.1: 06/97), DVB-RCP DVB interaction channel through the Public Switched Telecommunications System (PSTN)/Integrated Services Digital Network (ISDN) ETS 300 801 (V1: 08/97), DVB-RCG Interaction channel through the Global System for Mobile communications (GSM) EN 301 195 (V1.1.1: 02/99).

Thus, a user may request the delivery of a computer file by the BDB network 7 to the users terminal 9. As has been indicated above, such interactive functionality requires a return channel 21 from the terminal 9 to the DVB-T network 7 and a conditional access component in the terminal 9. The modem functionality is conveniently provided by a MS 3' connected to the PLMN 1, the main features of which are well known to those skilled in the art. To provide a return channel 21 from the terminal 9 to the BDB network 7, a connection is provided between the PLMN 1 and a subscriber management system (SMS) 23 of the BDB network 7. The MS 3' may be a separate entity in which case it could be interfaced to the Terminal 9 over a Low Power Radio Frequency (LPRF) or Infrared (IR) connection 25. Alternatively, the MS 3' may be integrated with the terminal 9.

As has been previously mentioned, the SMS 23 already has connections to the gateway 17 and the transmitter head-end equipment 19. It is thus possible for the user to issue requests for specific content via the user interface of the terminal 9 and thus through the MS 9 connected to the PLMN 1. The request is received by the SMS 23 which obtains the content from the gateway 17 and passes it to the head-end 19 for placing into data containers for onward transmission. It should be noted that the request from the user might include content which is not presently being transmitted by the BDB network 7. To ensure that the user only receives the requested content, the data is broadcast with an identifier which the conditional access component in the terminal 9 recognizes as being intended for delivery to the user. In the event that the content is received by another terminal 9, the conditional access component of that terminal 9 will prevent delivery of the content.

It will be further noted that interposed between the HLR 3 and SMS 23, is a controller 27 which although shown as a distinct entity could equally form part of the HLR/PLMN and/or SMS/BDB architecture. The controller 27 monitors the contents of the HLR 3 to identify where user activity in the PLMN 1 meets a pre-defined criterion. Thus, the HLR 3 may be monitored to identify those locations in the PLMN topology where the number of MS exceeds a particular threshold. In those locations where the threshold is exceeded, the controller 27 identifies that a so-called "hot-spot" exists. The controller 27 also includes a database which contains details of the likely source of a hot spot at a particular location. Examples of a potential source of a hot-spot have been mentioned above. Thus, there exits a conference center, airport and motorway junction within the coverage areas of cells C, G and H respectively. The database also includes an estimate of the likely ratio of MS to active terminals expected according to the category of the potential hot-spot. Thus at a conference center there is likely to be a strong correlation between the number of active MS present and the number of active terminals, although not necessarily belonging to the same users. However, at a motorway junction although the number of MS present may be quite high, the number of active terminals present may be much lower than that in the previous example as those terminals that are present may be switched off for safety reasons. Such estimates may be based on a statistical analysis of the likely type of MS user present at a particular source and his likely pattern of terminal use in such circumstances. Alternatively or additionally, the estimate could be built up through observation of the activity patterns of groups of users of the PLMN 1. Thus, as has been said, at a sporting event, or on the motorway, the ratio may be low whereas in an airport or at a conference center the ratio could be much higher. The information or profile determined by the controller 27 is then utilized through providing opportunities to content providers to deliver content to users in those hot spots. The controller 27 will also be able to establish a cost for delivering the content based on the demand on bandwidth and the like.

The controller 27 further provides monitoring for establishing a trigger level for demand in a particular location or locations which, for example, might be a small as a single group or as large as substantial portion or portions of the network.

In a further refinement of the above embodiment, the controller is given access to personal profiles of the users of MS and/or Terminals in the PLMN and BDB networks respectively. Thus, the identity of a user or group of users in a hot-spot could first be established from the information in the HLR 3 and the controller 27 could then provide the additional information contained in the corresponding personal profile(s) to a content provider. The content provider would then be further assisted in the selection of delivery opportunities for relevant content, that is the delivery criterion could be modified, if appropriate.

As will be apparent, the profile established by the controller 27 allows careful tailoring of the delivery of content to a group of terminals 9. It will further be appreciated that rather than set a single criterion or threshold in the controller 27 to determine locations having high demand, a set of different thresholds may be set having differing levels of demand thus giving the controller 27 operator the opportunity to provide a more accurate profile to potential content providers together with a correspondingly banded pricing structure.

Figure 3:
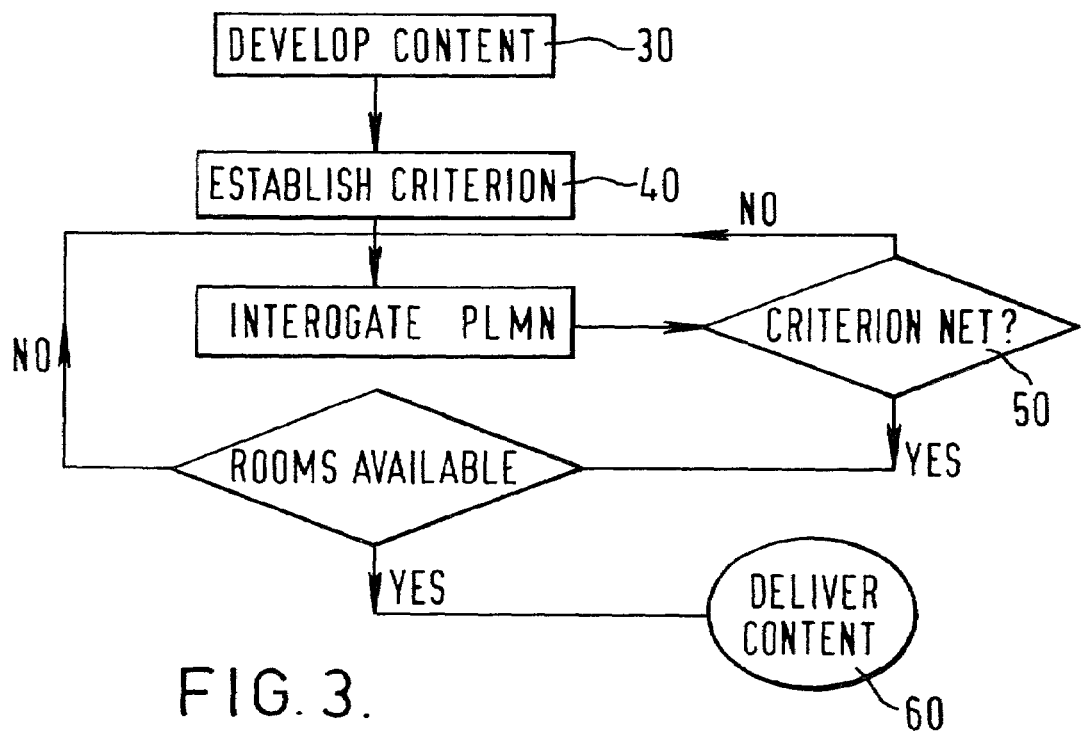
FIG. 3 is a flowchart illustrating a method for use with the system of FIG. 2.

One example of how an embodiment of the invention might be employed in delivering content to a terminal or terminals is set out below and illustrated in the flowchart of FIG. 3.

An advertiser might receive instructions from a client to promote services or goods. For example, a hotel chain may have a large number of rooms available in proximity to the conference center. The advertiser will, through negotiation with a service provider establish content 30 suitable for promoting the hotel chain. This information could be tailored to suit different localities where rooms are available perhaps by including local tourist information. The service provider will then, on the instructions of the advertiser establish a criterion or trigger level 40 at which the content would be provided both by reference to locality and user profile. After the criterion are established at point 40, the PLMN 1 is interrogated at 42. The results of the interrogation are provided to point 50 at which determination is made if the criterion are met. This information would be provided to the BDB network operator who would program the controller 27 with the appropriate information. Subsequently, should the trigger criterion be determined to be met by user activity in the PLMN network 1, then if rooms are determined to be available at step 52, the delivery of content from the service provider in the format agreed by the advertiser would take place at step 60.

Further embodiments of invention are described below:

A controller may be connectable to a wireless unidirectional digital broadband network and to a wireless bi-directional communications network. The controller includes a processor operable to initiate delivery of content via the wireless unidirectional digital broadband network to a determined area. This occurs in response to a number of user terminals in the determined area connected to the wireless bi-directional communications area exceeding a predetermined threshold value.

A corresponding content delivery system may also be provided.

The content delivery system may comprise a wireless unidirectional digital broadband network, a wireless bi-directional communications network; and a controller connected to both networks. The controller may comprise a processor, a storage device and software operative on the processor for maintaining in the storage device a database including threshold values associated with content corresponding to user activity. Further the software needs to monitor user activity in a wireless bi-directional communications network. Also, software takes care of delivering the content to a terminal connected to a wireless unidirectional digital broadband network when the user activity exceeds the corresponding threshold value.

One more embodiment relates to a content delivery method. The method comprises monitoring user activity in a wireless bi-directional communications network within an area and delivering content to a user terminal of a wireless unidirectional digital broadband network when a number of connected user terminals to the wireless bi-directional communications network within the area exceeds a predetermined threshold value.

It should be noted that although in the foregoing embodiment the terminal 9 is described as being interfaced to a MS 3' in order to provide a return channel 21, the presence of such an interface or indeed a return channel 21 is not necessary for the performance of the invention. Those skilled in the art will recognize that the only necessity is that there exists a population of users in one network whose activities can be correlated with the presence of terminals for delivery of content by another network.

What is claimed is:

1. An apparatus comprising:
 a processor; and
 memory storing computer readable instructions that, when executed by the processor, cause the processor to perform a method comprising:
  determining a number of active terminals in an area based on data derived from a second wireless network different from a first wireless network, wherein the first wireless network is a unidirectional digital broadband network and the second wireless network is a bi-directional communication network and wherein the unidirectional digital broadband network is a Digital video broadcast network;
  determining whether the determined number of active terminals meets a predefined threshold;
  in response to determining that the number of active terminals meets the predefined threshold, selecting content for delivery through the first wireless network, wherein the selection is made based on pattern of usage associated with one or more active terminals in the area; and
  initiating delivery of the selected content through the first wireless network.

2. An apparatus as claimed in claim 1, the memory further comprising instructions for:
 categorizing the one or more active terminals in the area into a plurality of groups based on the pattern of usage associated with the one or more active terminals in the area.

3. An apparatus as claimed in claim 2, wherein:
 a first content item is selected for delivery to a first group of active terminals and a second content item is selected for delivery to a second group of active terminals of the plurality of groups.

4. An apparatus as claimed in claim 3, wherein:
 the threshold is defined based on a type of location associated with the area.

5. An apparatus as claimed in claim 1, wherein:
 the data derived from the second wireless network comprises a number of connected user terminals to said second wireless network.

6. An apparatus as claimed in claim 1, wherein:
 the predetermined threshold value is defined based on a type of location associated with the determined area.

7. An apparatus as claimed in claim 1, wherein the content is an advertisement.

8. An apparatus as claimed in claim 1, wherein the data derived from the second wireless network comprises a geographic location of user terminals connected to the second wireless network.

9. An apparatus as claimed in claim 1, wherein initiating delivery of content through the first wireless network is performed in response to a criterion being met by second data derived from the second wireless network.

10. An apparatus as claimed in claim 9, wherein the second data derived from the second wireless network comprises a geographic location of user terminals connected to the second wireless network.

11. The apparatus of claim 1, wherein initiating delivery of the selected content through the first wireless network includes transmitting the selected content to at least one terminal in the area through the first wireless network without use of the second wireless network.

12. An apparatus as claimed in claim 1, the memory further storing instructions for:
 identifying that a hot spot exists in response to determining that the number of active terminals meets the predefined threshold; and
 storing information about the identified hot spot.

13. An apparatus as claimed in claim 12, wherein the identified hot spot information includes an estimate of a ratio of mobile stations to active terminals, wherein the estimate is based on a category of hot spot associated with the identified hot spot.

14. A system comprising:
 a controller connected to first and second wireless networks, the controller including a processor configured to:
  determine a number of active terminals in a determined area based on data derived from the second wireless network, wherein the first wireless network is a unidirectional digital broadband network and the second wireless network is a bi-directional communication network and wherein the unidirectional digital broadband network is a Digital video broadcast network;
  determine whether the number of active terminals in the determined area meets a predefined threshold;
  in response to determining that the number of active terminals in the determined area meets the predefined threshold, selecting content for delivery through the first wireless network based on a pattern of usage associated with one or more active terminals in the determined area; and
  initiate delivery of the selected content through the first wireless network.

15. A system as claimed in claim 14, wherein the processor is further configured to:
 categorize the one or more active terminals in the determined area into a plurality of groups based on the pattern of usage associated with the one or more active terminals.

16. A system as claimed in claim 15, wherein:
 the predefined threshold is defined based on a type of location associated with the determined area.

17. A system as claimed in claim 14, wherein:
 a first content item is selected for delivery for a first group of active terminals and a second content item is selected for delivery for a second group of active terminals of the plurality of groups.

18. A system as claimed in claim 14, wherein the content delivered through the first wireless network is provided by at least one source of content.

19. A system as claimed in claim 14, wherein:
 the data derived from the second wireless network comprises a number of connected user terminals to the second wireless network.

20. A method comprising:
 determining a number of active terminals in an area based on data derived from a second wireless network different from a first wireless network, wherein the first wireless network is a unidirectional digital broadband network and the second wireless network is a bi-directional communication network and wherein the unidirectional digital broadband network is a Digital video broadcast network;
 determining whether the determined number of active terminals meets a predefined threshold;

in response to determining that the number of active terminals meets the predefined threshold, selecting content for delivery through the first wireless network, wherein the selection is made based on a pattern of usage associated with one or more active terminals in the area; and initiating delivery of the selected content through the first wireless network.

21. The method as claimed in claim 20, wherein:

the data derived from the second wireless network comprises a number of connected user terminals to the second wireless network.

22. The method of claim 20, further comprising:

categorizing the one or more active terminals in the area into a plurality of groups based on the pattern of usage associated with the one or more active terminals in the area.

23. The method of claim 22, wherein a first content item is selected for delivery to a first group of active terminals of the plurality of groups and a second content item is selected for delivery to a second group of active terminals of the plurality of groups.

24. A computer readable medium storing computer readable instructions that, when executed, cause a processor to perform a method comprising:

determining a number of active terminals in an area based on data derived from a second wireless network different from a first wireless network, wherein the first wireless network is a unidirectional digital broadband network and the second wireless network is a bi-directional communication network and wherein the unidirectional digital broadband network is a Digital video broadcast network;

determining whether the determined number of active terminals meets a predefined threshold;

in response to determining that the number of active terminals meets the predefined threshold, selecting content for delivery through the first wireless network, wherein the selection is made based on a pattern of usage associated with one or more active terminals in the area; and initiating delivery of the selected content through the first wireless network.

25. The computer readable medium of claim 24, further comprising instructions for:

categorizing the one or more active terminals in the area into a plurality of groups based on the pattern of usage associated with the one or more active terminals in the area.

26. The computer readable medium of claim 25, wherein a first content item is selected for delivery to a first group of active terminals of the plurality of groups and a second content item is selected for delivery to a second group of active terminals of the plurality of groups.

* * * * *